Aug. 18, 1953  J. DICKSON  2,649,215
SILO CHARGING AND EMPTYING MACHINE
Filed June 26, 1950  3 Sheets-Sheet 1
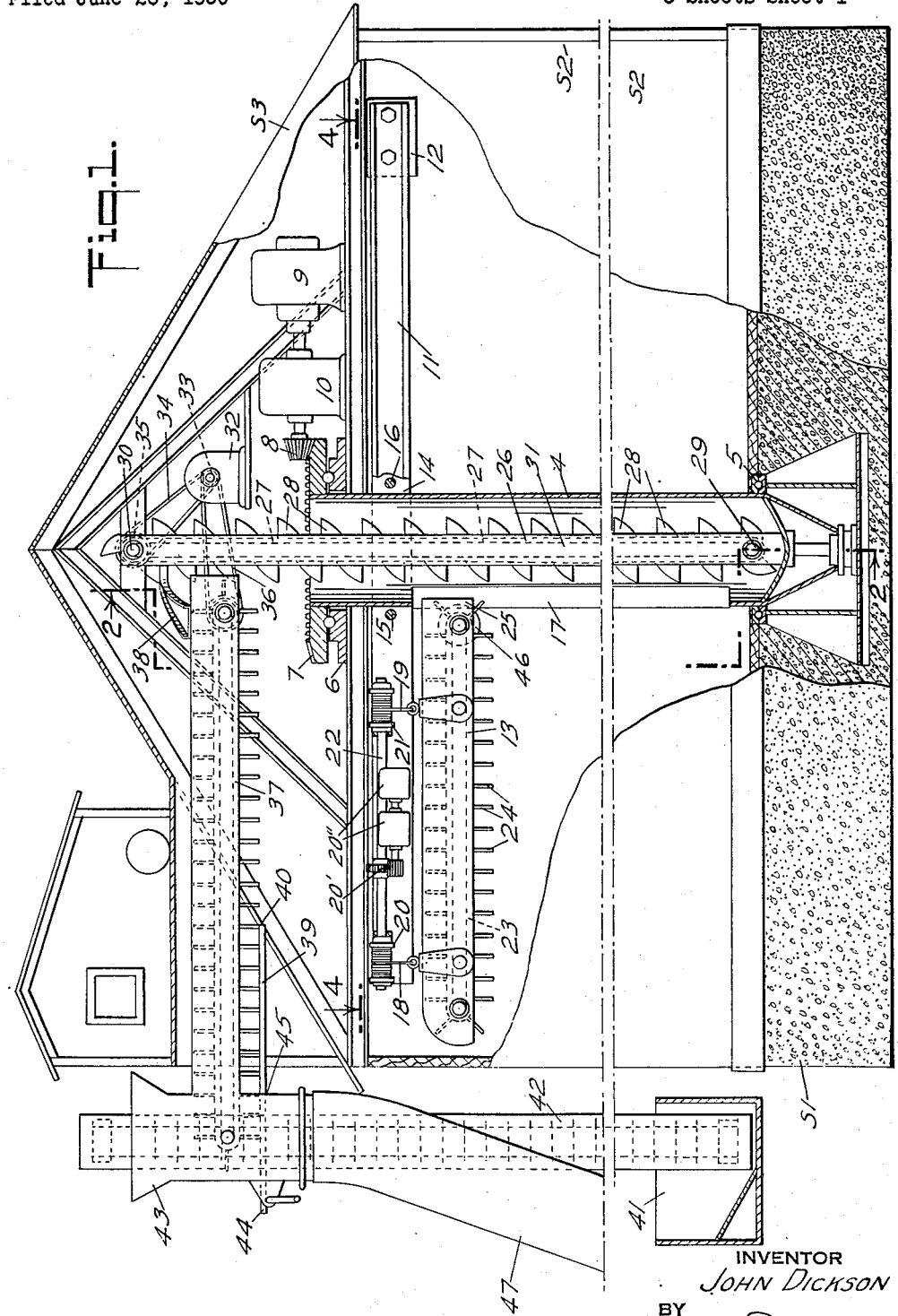
INVENTOR
John Dickson
BY
G.F. McDougall
ATTORNEY Aug. 18, 1953  J. DICKSON  2,649,215
SILO CHARGING AND EMPTYING MACHINE
Filed June 26, 1950  3 Sheets-Sheet 2
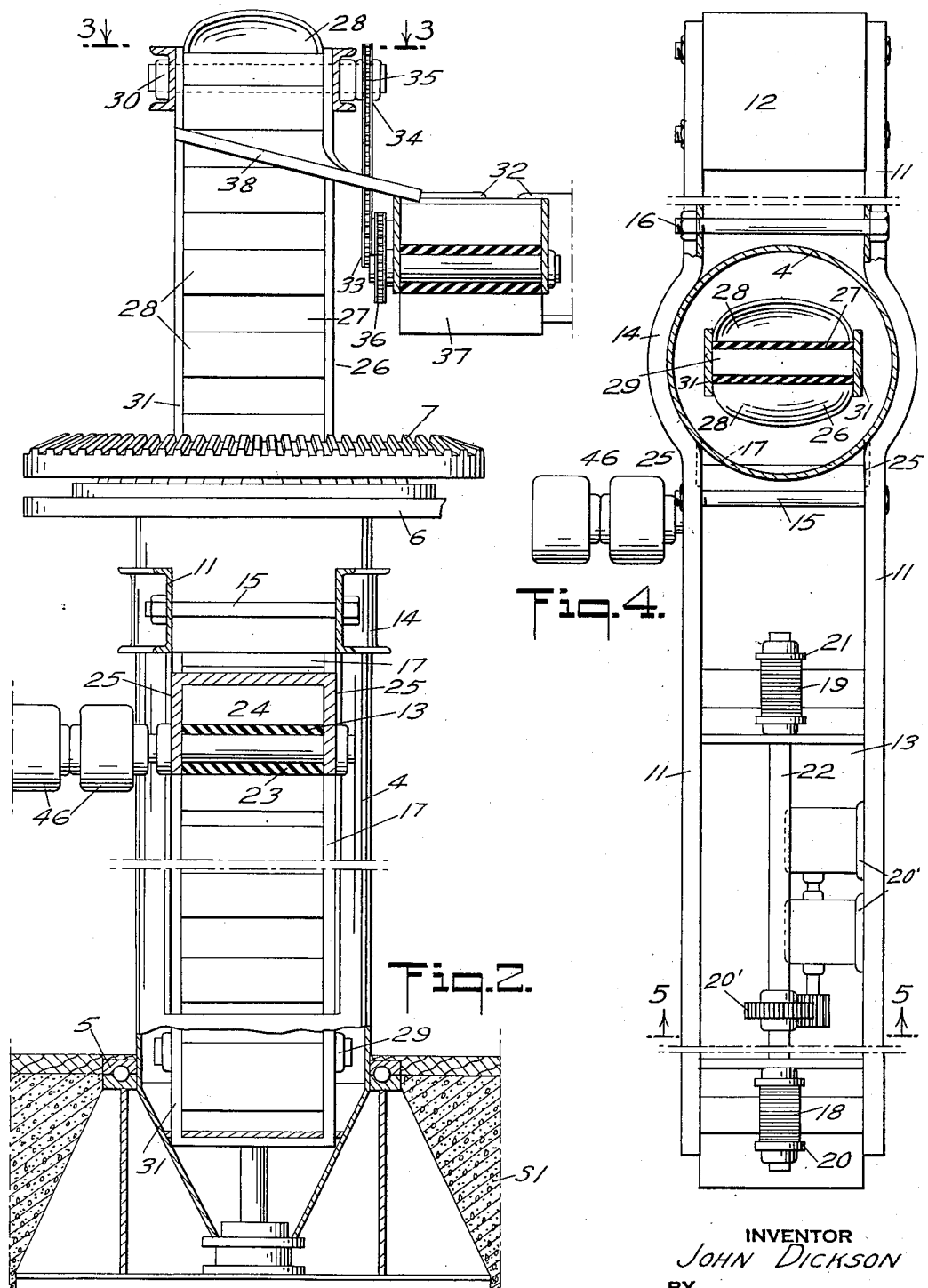
INVENTOR
JOHN DICKSON
BY
G. F. McDougall
ATTORNEY Aug. 18, 1953           J. DICKSON           2,649,215
SILO CHARGING AND EMPTYING MACHINE
Filed June 26, 1950           3 Sheets-Sheet 3
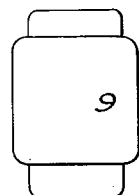
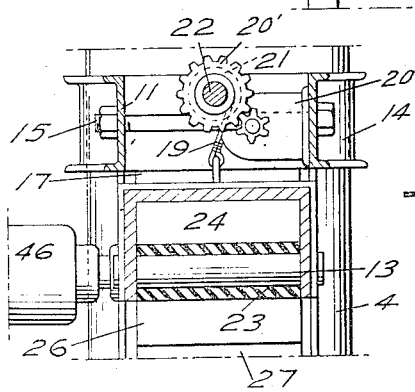
INVENTOR
JOHN DICKSON
BY
ATTORNEY Patented Aug. 18, 1953

2,649,215

UNITED STATES PATENT OFFICE 2,649,215

SILO CHARGING AND EMPTYING MACHINE

John Dickson, Portland, Oreg., assignor of one-half to William J. Prendergast, Jr., Portland, Oreg.

Application June 26, 1950, Serial No. 170,303

12 Claims. (Cl. 214—17)

This invention relates to mechanical means for charging and subsequently discharging silage into and out of a very large silo.

Silage is one of the best feeds for dairy cattle yet developed and is widely used; but in the case of a large dairy, feeding and milking several hundred head of cows, the number of silos necessary to feed them requires a fantastic investment since they must be small enough for a workman to throw silage from one side through the customary slot opened and closed by sectional closures in one side of a silo, limiting maximum practical diameter to twenty feet.

Silage, stored under pressure in a silo, undergoes an acid fermentation in its transformation from cut green stuff to succulent winter cattle feed, and tends to adhere together, which makes it difficult to fork across a large diameter silo or tank, and mechanical means of a satisfactory character has not yet been acceptably devised; though several things are the subject of earlier patents. None, it is believed, proposed to be adaptable to originally pack the cut green vegetation into the silo preparatory to making silage and then by slight manipulation of controls when the time for feeding silage arrives, to discharge required amounts, evenly, through a suitable discharge pipe or chute. This broadly states the function of the present invention, the key structure of which is a revoluble metal well, mounted axially in the silage tank, which may be sixty feet or more in diameter and thirty-five or more feet high as to the silage tank proper, with superposed operating equipment above the silo proper, and beneath an adequate roof.

It is the principal object of the present invention to create such a silo, properly equipped, at an investment justified handsomely by its effectiveness. Other objects will be apparent from the description that follows, of the best form of the invention, and are defined in the claims.

Drawings accompany and form a part of this disclosure, in which:

Fig. 1 is a schematic arrangement of a foreshortened silo, showing the essentials of the invention, partially in sectional elevation, to be supplemented by other views;

Fig. 2 is a sectional elevation at larger scale, taken on the plane 2—2 of Fig. 1;

Fig. 3 is a view taken on the plane 3—3 of Fig. 2, partially sectioned;

Fig. 4 is an enlarged view taken on the plane 4—4, Fig. 1, showing the sweep conveyor carried by the revolving well 4; and Fig. 5 is a section taken on the plane 5—5, Fig. 4.

Describing the drawings in greater detail: A silo comprising a foundation S1, cylindrical wall structure S2 and roof S3, contains an axially positioned revolving well 4, carried by lower bearings 5, upper bearings 6, driven through a bevel gear 7 by a pinion 8, properly meshed therewith and selectively operable by an electric motor 9, through a suitable reducing gear 10, since in a large silo the revolution of the well 4 will of necessity be quite slow as will be seen.

Securely clamped to the well 4 is a counterbalanced sweep beam 11, carrying a counterbalance weight 12 at one end and supporting a sweep conveyor 13 by the extension of the opposite end, being secured to the revolving well 4, by suitable clamp structure 14, and clamp bolts 15 and 16.

The well 4 is provided with a vertical slot 17 that extends from a short distance above the bottom (see Fig. 2) to a point just beneath the lower side of the clamp 14. A sweep conveyor 13 is suspended beneath the sweep beam 11 at the end opposite the counterweight 12 by hoisting ropes 18 and 19, controllable by rope winding drums 20 and 21, mounted on a common shaft 22, and operable at proper speed in a selective direction of rotation by the gear-motor set 20″ through the gear 20′ by suitable wiring not shown as such wiring circuits are well known.

The sweep conveyor 13 carries a suitably mounted conveyor belt 23 with attached flights 24. The inner end of the sweep conveyor 13, slides vertically in registration with the slot 17, within which it is interengaged for vertical sliding movement as shown at 25. It is named a sweep conveyor for the reason that its rigidity projecting flights will convey material while moving in either direction, or rake when moved only by the boom.

Within the well 4, is a lifting conveyor 26, in the form of a belt 27, upon which numerous buckets 28, of proper form, are mounted to turn over drums 29 and 30 at the bottom and top respectively of the conveyor frame 31. The conveyor belt with its flights, or buckets as they are often called, is operated by the gear-motor set 32, by suitable drive means, here shown as a sprocket and chain drive, comprising a drive sprocket 33, operating a chain 34, with driven sprocket 35, for the lift conveyor 26, and with another drive sprocket on the same shaft immediately behind drive sprocket 33 that operates chain 36 and drives the cross conveyor 37. Silage lifted by lift conveyor 26, is transferred by transfer plate 38, to the upper reach of the cross conveyor 37, which runs towards the left (Fig. 1), and carries silage to its end, the operation of which is hereinafter explained. The lower reach of cross conveyor 37, is partially enclosed in the closed conveyor box 39 to its open end 40.

I must now explain the mode of operation, which depends entirely upon a peculiar quality of cut ensilage, especially when it is green, of having no flow characteristic of any considerable amount; that is, when an opening, like the slot in the well 4, is of moderate width, as in this case it will be, and green silage is stacked in the silo to a depth of thirty feet or more, a very little of it will fall through the slot into the well; taking advantage of this fortuitous state of affairs, silage usually from a cutter or it may of course be from a dump truck, is fed to the receiving hopper 41 and is lifted by a suitable lifting conveyor 42 (which is not detailed as such lifter conveyors are well known) and dumped into the receiving hopper 43, where it falls onto the slide gate 44, shown closed and with its inner end 45 matching the left hand end of the conveyor box 39, where it falls into influence of the cross conveyor 37, is carried to the end of the conveyor box 39 and falls into the silo S2 without hindrance.

This operation continues indefinitely until the silo is completely filled. As the material starts to pile up, the motor gear sets 9—10 is started, revolving the well 4 and with it the sweep beam 11, with the sweep conveyor 13; and note that under these conditions the conveyor belt 23 will not be operating. The opposite end of the beam 11 may, if desirable, carry sweeping means suitable for supplementing the distribution of the silage carried on by the revolving beam, depending upon the rapidity of supplying silage to fill the silo. During this process, some silage will inevitably fall through the slot 17 into the well 4, and be promptly returned to the slide gate 44, and the conveyor that brought it had to operate anyway.

When it is desired to discharge the silage from the silo in normal feeding operations of the stock which it supplies, the slide gate 44 is pulled wide open and at such seasons the receiving hopper 43 will be closed storm proof by suitable means not shown.

The sweep conveyor 13, with its flights 24, will be operated selectively by the gear motor set 46 while the well is slowly revolved by the motor gear set 9—10 to gather silage with fair equality from the top surface of silage within the silo, deliver it to the lifting conveyor through the slot into the well 4 from which the lifting conveyor and the cross conveyors deliver the material to delivery chute 41, which for the purposes stated is considered complete.

I claim:

1. Filling and emptying means for cylindrical tank silo structures, comprising a tubular metal well rotatively mounted axially within said tank, said well formed with a continuous delivery slot longitudinally in one side thereof from top to bottom of the working length thereof, a non-revolving conveyor truss mounted coaxially within said tube, a double reach conveyor belt on said truss, a movable conveyor boom slidably attached to said tubular metal well, being mounted to traverse said delivery slot longitudinally and to revolve with said well, an independent conveyor mounted on said boom, radially with respect to said tank, motor means for selectively driving said last named conveyor when discharging silage from the tank to move tank contents through said slot to deliver the same to said first named conveyor.

2. Apparatus for filling and emptying a tank silo, comprising a vertical axial revoluble metal well within said silo, said well provided with a continuous longitudinal slot, lengthwise in one wall thereof, means for selectively revolving said well, a boom slidably supported in normal registry with said slot, a conveyor carried thereby, being selectively operable to move silage from the silo into said metal well, through said slot, conveyor means mounted within said well effective to deliver silage received through said slot to a delivery device outside of said tank.

3. The combination as claimed in claim 2, including means for delivering silage to fill the silo by a partial use of said last named conveyor and said boom to sweep the delivered contents to substantially level filling within the tank.

4. A tank silo with filling and emptying means, comprising a vertical cylindrical silo tank, an axial well of metal revolubly mounted within said tank, a continuous vertical discharge slot provided in the perimeter of said well, a sliding shoe member movable lengthwise over said slot, a conveyor boom carried as to its inside end by said shoe, other means supporting said boom substantially normal to said well, a conveyor non-revolubly mounted within said well and an independent sweep conveyor mounted beneath said boom with downwardly projecting arms independently operable to deliver silage from storage in the silo, through said slot to said first named conveyor.

5. A tank silo having in combination therewith a revoluble metal well member axially positioned within said silo, means for revolving said well, a conveyor within said well, a continuous vertical silage discharge slot provided in the perimeter of the well, sweep conveyor means for discharging silo contents into said well through said slot and conveyor means partially positioned within said well, effective to take silage from said well and convey it to a delivery point externally of the tank.

6. A tank silo having in combination therewith a centrally positioned revoluble metal well member, said well provided with a vertical through slotted opening in one side of its perimeter, a boom mounted slidably on said well, to traverse said slot from top to bottom, selectively, while projecting therefrom radially, a selectively operable sweep conveyor carried by said boom effective to deliver silage into said well through said slot, and conveying means operably mounted within said well effective to convey delivered silage to a point outside of said tank.

7. The combination as claimed in claim 6 distinguished by the conveyor carried by said boom being in part composed of downwardly projecting flights effective to level-rake the top of fresh cut silage material, when the boom is revolved with the well during silage storing operations, the conveyor being at rest.

8. A silage storage tank having charging and discharging apparatus including an axially mounted revoluble well member, means for revolving said well member, a lifting conveyor operably mounted within said well effective to lift material out of the upper end of the well, said well member provided with a vertical slot throughout substantially its length that is within the tank and sweep conveying means mounted upon said well member to revolve therewith, effective to tear settled silage up from a mass of silage within said storage tank and deliver the same through said slot to said lifting conveyor, 9. A silo comprising a circular tank having large diameter and proportionate height containing filling and emptying means comprising an axially positioned revoluble metal well, said metal well provided with a continuous delivery slot from top to bottom of its storage space, a boom clamped to said well above its storage space, a sweep conveyor suspended beneath said boom, being slidably joined to said well to register therewith to deliver contents to said well, said well containing a lifting conveyor, for discharging said silo by operating said sweep conveyor, said lifting conveyor, and revolving said well concurrently.

10. The combination as claimed in claim 9 wherewith is included a relatively fixed conveyor above the storage portion of said silo, reversely operable to fill the silo during one season of the year and by reversing to deliver silage from the top of the stored silage by being lifted from said well and delivered to said fixed conveyor.

11. The combination claimed in claim 10 wherewith is included in combination with the sweep conveyor an interengaging means slidably connecting it to the revoluble metal well in registration with the delivery slot at all positions within said silo.

12. A storage silo with means for intermittent delivery for feeding from the top of stored silage, comprising a cylindrical silo tank sealed at the bottom against atmosphere, a revoluble metal well axially positioned therein, a lifting conveyor in said well, a bucket carrying belt forming a part of said lifting conveyor, other conveyor means positioned to receive the discharge of said lifting conveyor, said revoluble metal well being provided with a silage ingress slot throughout its effective length, said slot bounded on its vertical sides by interengaging means for the vertical sliding movement of a sweep conveyor, said sweep conveyor interengaged with said ingress slot and selectively operable in either direction to control quantity delivered to the revoluble well, or as a sweep to level the contents of said silo.

JOHN DICKSON.

References Cited in the file of this patent

UNITED STATES PATENTS

| Number | Name | Date |
| --- | --- | --- |
| 750,241 | Buck | Jan. 19, 1904 |
| 772,911 | Acklin | Oct. 25, 1904 |
| 826,646 | Blaisdell | July 24, 1906 |
| 1,257,161 | Walters et al. | Feb. 19, 1918 |

FOREIGN PATENTS

| Number | Country | Date |
| --- | --- | --- |
| 38,820 | France | Apr. 27, 1931 |
| 566,325 | Germany | Dec. 15, 1932 |